United States Patent
Utsugi

(10) Patent No.: US 8,155,439 B2
(45) Date of Patent: Apr. 10, 2012

(54) IMAGE PROCESSING APPARATUS FOR CORRECTING IMAGE COLOR AND IMAGE PROCESSING PROGRAM

(75) Inventor: Akihiko Utsugi, Machida (JP)

(73) Assignee: Nikon Corporation, Tokyo (JP)

(*) Notice: Subject to any disclaimer, the term of this patent is extended or adjusted under 35 U.S.C. 154(b) by 511 days.

(21) Appl. No.: 12/312,712

(22) PCT Filed: Nov. 19, 2007

(86) PCT No.: PCT/JP2007/001254
§ 371 (c)(1),
(2), (4) Date: May 22, 2009

(87) PCT Pub. No.: WO2008/068884
PCT Pub. Date: Dec. 6, 2008

(65) Prior Publication Data
US 2010/0074519 A1    Mar. 25, 2010

(30) Foreign Application Priority Data
Nov. 30, 2006 (JP) ................. 2006-323541

(51) Int. Cl.
*G06K 9/00* (2006.01)
(52) U.S. Cl. ......... 382/167; 382/162; 382/163; 382/165
(58) Field of Classification Search ............... 382/167, 382/165, 168, 162, 163; 358/520, 504, 518; 348/242, E5.078
See application file for complete search history.

(56) References Cited

U.S. PATENT DOCUMENTS

| | | | |
|---|---|---|---|
| 5,838,465 A * | 11/1998 | Satou et al. | 358/520 |
| 2005/0168614 A1 | 8/2005 | Okada et al. | |
| 2006/0098253 A1 | 5/2006 | Masuno et al. | |
| 2007/0116375 A1 | 5/2007 | Utsugi et al. | |

FOREIGN PATENT DOCUMENTS

| | | |
|---|---|---|
| JP | A-2000-299874 | 10/2000 |
| JP | A-2002-344978 | 11/2002 |
| JP | A-2003-255424 | 9/2003 |
| JP | A-2004-64710 | 2/2004 |
| JP | A-2004-064712 | 2/2004 |
| JP | A-2006-135745 | 5/2006 |
| WO | WO 2005/101854 A1 | 10/2005 |

OTHER PUBLICATIONS

Office Action issued in Japanese Patent Application No. 2006-323541 dated Apr. 19, 2011 (with Translation).

* cited by examiner

*Primary Examiner* — Anh Hong Do
(74) *Attorney, Agent, or Firm* — Oliff & Berridge, PLC

(57) ABSTRACT

An image processing device of the present application includes a color drift correcting section, a saturation reduction calculating section, and a color correcting section. The color drift correcting section corrects a color drift of an input image and generates a color drift correction image. The saturation reduction calculating section calculates a degree of saturation reduction caused by the color drift correction by comparing the input image with the color drift correction image. The color correcting section performs a color correction depending on the degree of saturation reduction with respect to a processed image of either one of the input image and the color drift correction image.

11 Claims, 6 Drawing Sheets

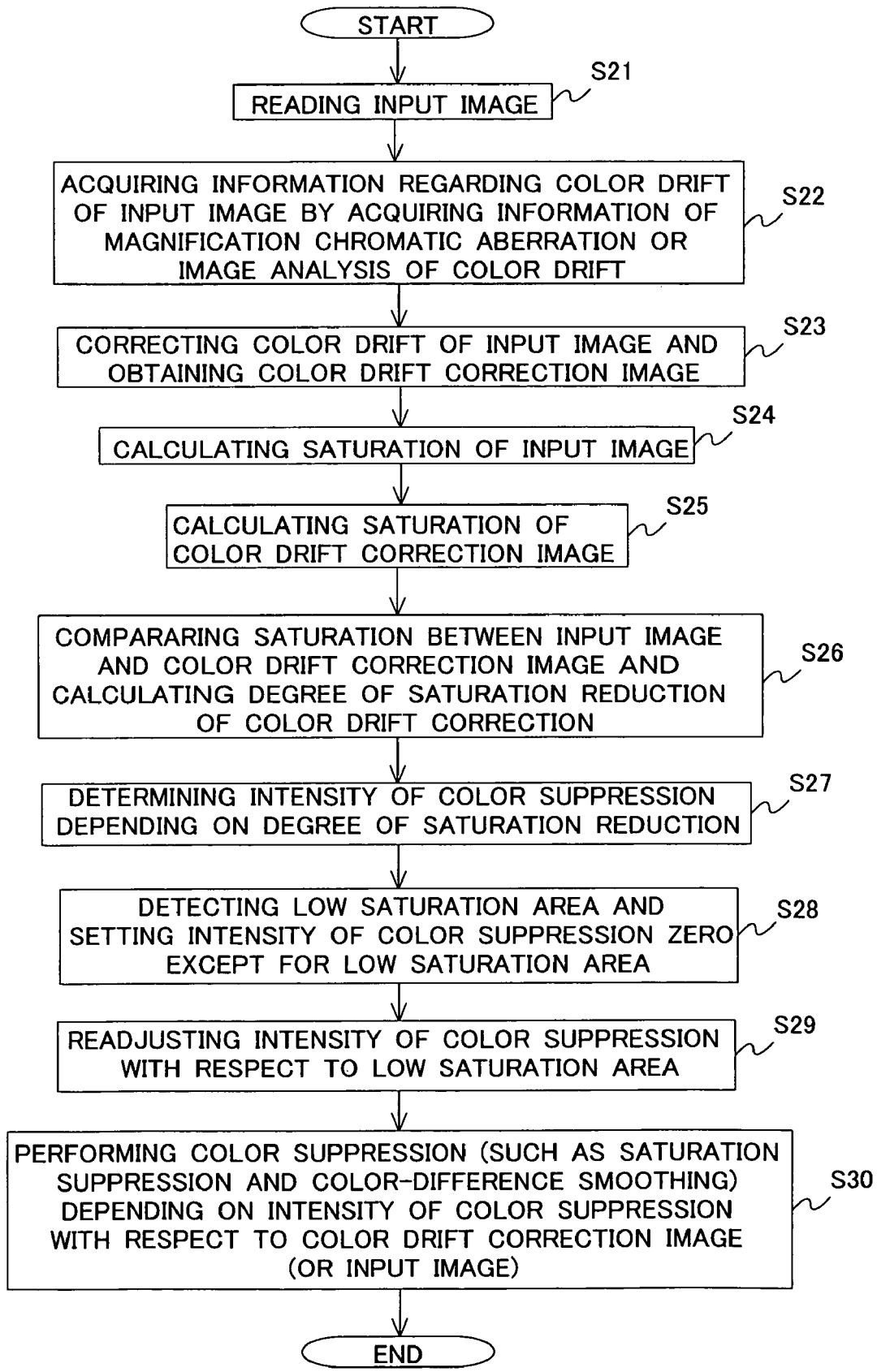

IMAGE PROCESSING APPARATUS FOR CORRECTING IMAGE COLOR AND IMAGE PROCESSING PROGRAM

This application is a U.S. National Stage application claiming the benefit of prior filed International Application Number PCT/JP2007/001254, filed Nov. 19, 2007, in which the International Application claims a priority date of Nov. 30, 2006 based on prior filed Japanese Application Number 2006-323541, the entire contents of which are incorporated herein by reference.

TECHNICAL FIELD

The present application relates to an image processing device for correcting the color of an image, and to an image processing program.

BACKGROUND ART

In general, it is known that, due to magnification chromatic aberration of a shooting lens, color drift occurs in a picked-up image of an electronic camera. Moreover, it is known that, due to an error in alignment (registration error) of an image pickup device, color drift occurs in a picked-up image of a three-plate imaging apparatus.

Technologies for correcting such kind of color drift by image processing have been proposed. For example, a conventional apparatus according to Patent Document 1, first detects color drift for an edge portion of an image, and performs image processing for correcting the color drift. Moreover, a conventional apparatus according to Patent Document 2 adjusts magnification for each color component of an image and searches a minimum point of difference between color components, to correct magnification chromatic aberration of the image.

Patent Document 1: Japanese Unexamined Patent Application Publication No. 2000-299874

Patent Document 2: Japanese Unexamined Patent Application Publication No. 2002-344978

DISCLOSURE

Problems to be Solved

In addition, in some shooting lenses, other than the magnification chromatic aberration, color comma aberration etc. also occur. In the color comma aberration, color smear appears at the borderline of a picture. Moreover, image processing such as color difference smoothing, may spread color difference caused by magnification color aberration peripherally. In such a kind of image, differences in waveform structure between color components, which are not present in an original picture, appear. Such differences in color structure cannot be removed only by positional correction of color drift.

In addition, being subjected to color-difference smoothing or saturation suppression to the whole image can reduce the differences in color structure. However, these approaches also remove valuable image information of a picture itself. Therefore, it is difficult to reduce sufficiently the differences in color structure while suppressing influence on a picture itself.

Accordingly, the object of the present application is to reduce suitably the differences in color structure, which cannot be fully removed only by positional correction of color drift.

Means for Solving the Problems

<1> An image processing device according to the present embodiment includes a color drift correcting section, a saturation reduction calculating section, and a color correcting section.

The color drift correcting section corrects a color drift of an input image and generates a color drift correction image.

The saturation reduction calculating section calculates the degree of saturation reduction caused by the color drift correction by comparing the input image with the color drift correction image.

The color correcting section performs a color correction depending on the degree of saturation reduction with respect to a processed image of either one of the input image and the color drift correction image.

<2> In addition, preferably, the color correction by the color correcting section is a processing which suppresses more strongly a color of a portion in which the degree of saturation reduction being large than a color of a portion in which the degree of saturation reduction being small.

<3> Moreover, preferably, the color correction by the color correcting section is a processing which determines a portion in which the degree of saturation reduction being large in the processed image, and suppresses a saturation of the portion.

<4> In addition, preferably, the color correction by the color correcting section is a processing which determines a portion in which the degree of saturation reduction being large in the processed image, and smoothes a color differences of the portion.

<5> Moreover, preferably, the color correcting section determines an image area with a low saturation, and performs more strongly the color correction of the image area than areas other than the image area with the low saturation.

<6> An image processing program according to the present embodiment is a program which causes a computer to function as the image processing device according to any one of items <1> to <5>.

Effects

In the present embodiment, an image structure depending on characteristic amount which is called a local saturation change before and after color drift correction (degree of saturation reduction).

It is estimated that a portion where the degree of saturation reduction is large, is one where color drift correction matches signal levels of each color component well. At such a portion, since structures of color components (such as R and G) are similar each other originally, it is possible to consider slight differences in the structure between the color components as differences in color structure such as remaining chromatic aberration, rather than significant image information of a picture itself.

On the contrary, a part where the degree of saturation reduction is small includes one where differences in image structure between the color components are large. Such a portion is not comparatively conspicuous even if chromatic aberration is remained, because the differences in image structure between the color components are originally large.

Accordingly, in the present embodiment, color correction of a processed image is adjusted depending on the degree of saturation reduction. The adjustment enables to reduce differences in color structure effectively, which can not be fully removed by color drift correction, while suppressing influence on a picture itself.

BRIEF DESCRIPTION OF THE DRAWINGS

FIG. 8 is a flow chart showing an operation of a third embodiment.

DETAILED DESCRIPTION OF THE EMBODIMENTS

First Embodiment (Description of Configuration of Image Processing Device)

Figure 1:
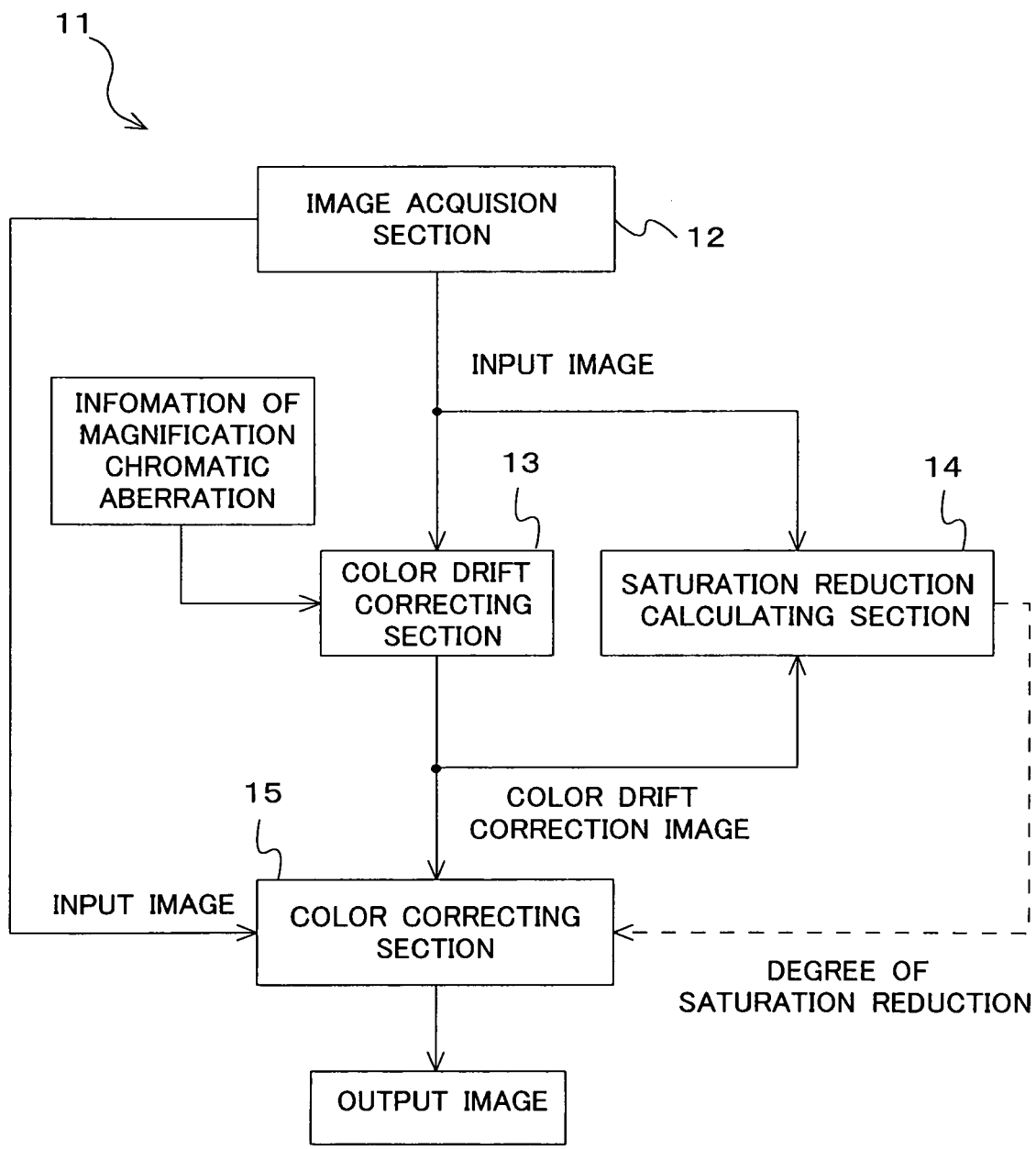
FIG. 1 is a block diagram showing a configuration of an image processing device 11.

FIG. 1 is a block diagram showing the configuration of an image processing device 11. In FIG. 1, an image acquisition section 12 stores an input image that is a processing target in an internal memory. A color drift correcting section 13 takes in the input image, and performs color drift correction. A saturation reduction calculating section 14 compares saturation before and after the color drift correction, and calculates a local saturation change (degree of saturation reduction) caused by the color drift correction. A color correcting section 15 controls the strength of color correction with respect to a color drift correction image (or an input image) depending on the degree of saturation reduction.

In addition, a computer and an image processing program may realize the image processing device 11 in a manner of software. Moreover, it is possible to incorporate the image processing device 11 in an imaging apparatus such as an electronic camera or a scanner, and use it for image processing in the imaging apparatus.

Description of Operation of First Embodiment

Figure 2:
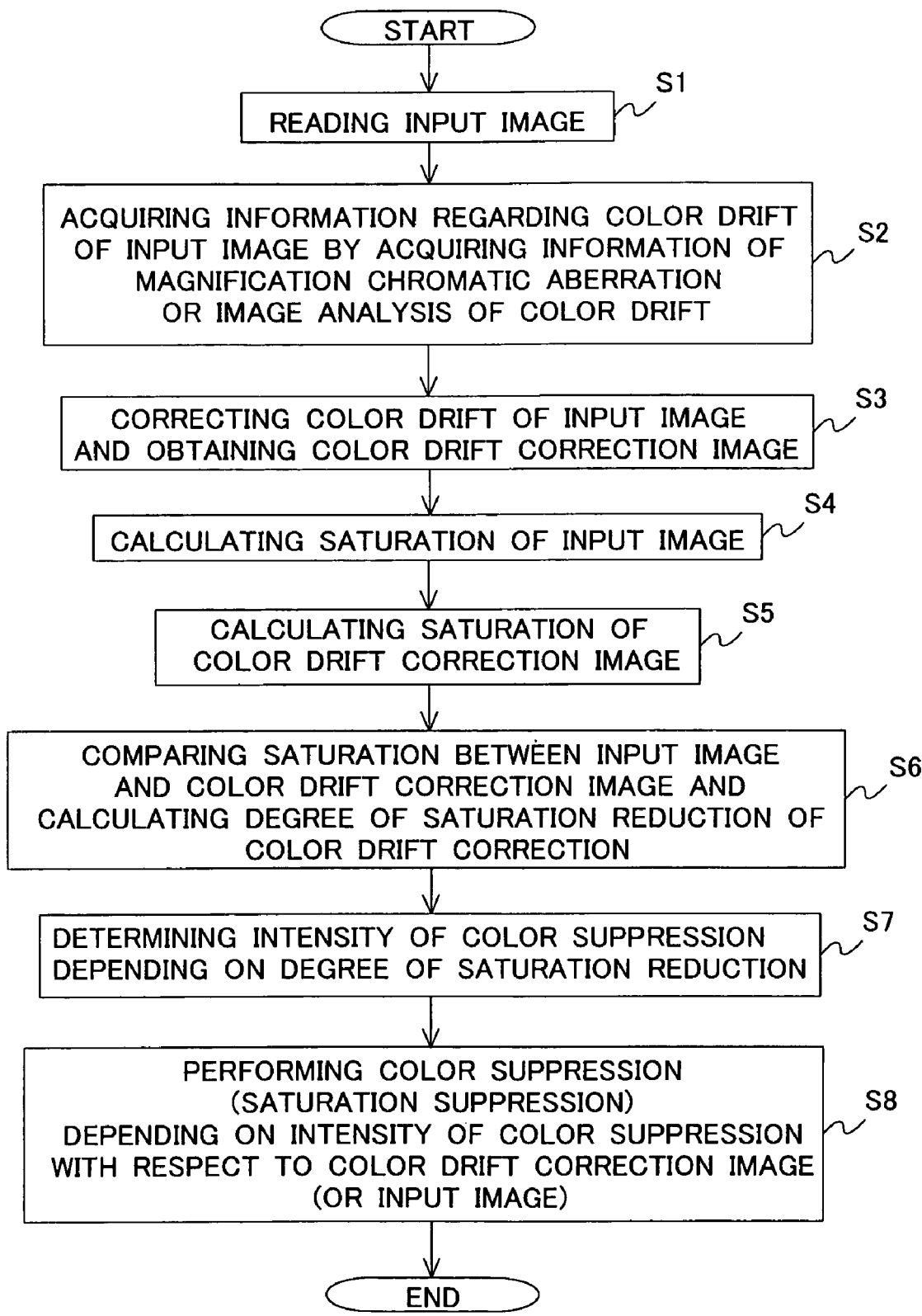
FIG. 2 is a flow chart showing an operation of a first embodiment.

FIG. 2 is a flow chart showing an operation of the first embodiment. Hereinafter, the operation will be described in a sequential-order of step numbers shown in FIG. 2.

Step S1: The image acquisition section 12 reads an input image generated by an electronic camera etc. through a communication medium or a recording medium. For example, the input image is converted into signal values of RGB color components, and stored in an internal memory.

Step S2: The color drift correcting section 13 acquires information on color drift of the input image. For example, it is allowed to acquire magnification chromatic aberration data regarding an optical system of the shooting time from tag information (EXIF information, etc) of the input image, and use it information of color drift. Moreover, it is also allowed to estimate magnification chromatic aberration from information such as kind of a shooting lens, a focal length, or the like of the shooting time, and use it as information of color drift. Moreover, it is also allowed to obtain color drift by image analysis of the input image.

Step S3: The color drift correcting section 13, based on the information about the color drift obtained at step S2, corrects color drift of the input image, and acquires a color drift correction image.

For example, the section 13 corrects positions of R and B components of an input image with respect to G component by an amount of color drift, and obtains corrected pixel positions of R and B components. Then, by interpolating the pixel positions of R and B components, the section 13 obtains color drift-corrected R and B components at the pixel position of G component. It is possible to acquire a color drift correction image by performing a component to the color drift-corrected R and B components and G component of an input image.

Step S4: The saturation reduction calculating section 14 calculates values representing color saturation of the input image.

For example, by substituting RGB components (R1(x, y), G(x, y), B1(x, y)) of a coordinate (x, y) of the input image into the following formulas, the section 14 calculates color difference values $Cr1(x, y)$ and $Cb1(x, y)$ at the coordinate (x, y).

$$Cr1(x,y)=R1(x,y)-G(x,y)$$

$$Cb1(x,y)=B1(x,y)-G(x,y)$$

It calculates absolute values $|Cr1(x, y)|$ and $|Cb1(x, y)|$ of the color difference values, and uses them as values $Sr1(x, y)$ and $Sb1(x, y)$ representing saturation of the coordinate (x, y).

$$Sr1(x,y)=|Cr1(x,y)|$$

$$Sb1(x,y)=|Cb1(x,y)|$$

Step S5: Furthermore, the saturation reduction calculating section 14 also calculates values representing color saturation of the color drift correction image. For example, by substituting RGB components (R2(x, y), G(x, y), B2(x, y)) of the coordinate (x, y) of the color drift correction image into the following formulas, the section 14 calculates color difference values of RGB components $(Cr2(x, y), Cb2(x, y))$ at the coordinates (x, y).

$$Cr2(x,y)=R2(x,y)-G(x,y)$$

$$Cb2(x,y)=B2(x,y)-G(x,y)$$

It calculates absolute values $|Cr2(x, y)|$ and $|Cb2(x, y)|$ of the color difference values, and uses them as values $Sr2(x, y)$ and $Sb2(x, y)$ representing saturation of the coordinate (x, y).

$$Sr2(x,y)=|Cr2(x,y)|$$

$$Sb2(x,y)=|Cb2(x,y)|$$

In addition, it may calculate local smoothing values, local maximum values and the like of the absolute values $|Cr2(x, y)|$ and $|Cb2(x, y)|$ to use them values $Sr2(x, y)$ and $Sb2(x, y)$ representing the saturation of the coordinate (x, y).

Step S6: The saturation reduction calculating section 14 compares the saturation of the input image with that of the color drift correction image, and calculates the degree of saturation reduction caused by the color drift correction.

For example, based on the following formulas, the section 14 calculates the degrees of saturation reduction $Cr\_down(x, y)$ and $Cb\_down(x, y)$ at the coordinate (x, y).

$$Cr\_down(x,y)=Sr1(x,y)-Sr2(x,y)$$

$$Cb\_down(x,y)=Sb1(x,y)-Sb2(x,y)$$

In addition, it may perform local smoothing with respect to these degrees of saturation reduction $Cr\_down(x, y)$ and $Cb\_down(x, y)$, and obtain degrees of saturation reduction Cr_down2 (x, y) and Cb_down2 (x, y) of the coordinate (x, y), in which high area variation components are suppressed.

$$Cr\_down2(x,y)=1/16\times[4\times Cr\_down(x,y)+2\times\{Cr\_down(x+2,y)+Cr\_down(x-2,y)+Cr\_down(x,y+2)+Cr\_down(x,y-2)\}+\{Cr\_down(x+2,y+2)+Cr\_down(x+2,y-2)+Cr\_down(x-2,y+2)+Cr\_down(x-2,y-2)\}]$$

$$Cb\_down2(x,y)=1/16\times[4\times Cb\_down(x,y)+2\times\{Cb\_down(x+2,y)+Cb\_down(x-2,y)+Cb\_down(x,y+2)+Cb\_down(x,y-2)\}+\{Cb\_down(x+2,y+2)+Cb\_down(x+2,y-2)+Cb\_down(x-2,y+2)+Cb\_down(x-2,y-2)\}]$$

Step S7: The color correcting section 15 determines intensity of color suppression to strengthen color suppression more for the coordinate (x, y) that exhibits larger degree of saturation reduction.

For example, according to the following conditional formulas, the section 15 determines the intensity of color suppression Cr_str (x, y) and Cb_str (x, y).

```
IF (Cr_down2(x, y) > Thr) {
Cr_str(x, y) = k × (Cr_down2(x, y) – Thr)
} else {
Cr_str(x, y) = 0}
IF (Cb_down2(x, y) > Thb) {
Cb_str(x, y) = k × (Cb_down2(x, y) – Thb)
} else {
Cb_str(x, y) = 0
}
```

In addition, parameters k, Thr and Thb in the above formula are experimentally determined, based on image quality evaluation of the color correction result described later. For example, when color components are composed of 8 bits of gradation, it is suitable to set approximately k=0.6 and Thr=Thb=12.

Step S8: The color correcting section 15 performs color suppression (here, saturation suppression) depending on the intensity of color suppression with respect to the color difference values Cr2 (x, y) and Cb2 (x, y) of a color drift correction image.

For example, according to the following procedure, difference values Cr3 (x, y) and Cb3 (x, y) after color suppression are determined.

First, a portion where Cr_str(x, y)>0 is satisfied, is extracted from the color drift correction image. For the portion, calculate:

```
IF (Cr2(x, y) > Cr_str(x, y)) {
Cr3(x, y) = Cr2(x, y) – Cr_str(x, y)
} else IF (Cr2(x, y) < –Cr_str(x, y)) {
Cr3(x, y) = Cr2(x, y) + Cr_str(x, y)
} else {
Cr3(x, y) = 0
}
```

Similarly, a portion where Cr_str(x, y)>0 is satisfied, is extracted from the color drift correction image. For the portion, calculate:

```
IF (Cb2(x, y) > Cb_str(x, y)) {
Cb3(x, y) = Cb2(x, y) – Cb_str(x, y)
} else IF (Cb2(x, y) < –Cb_str(x, y)) {
Cb3(x, y) = Cb2(x, y) + Cb_str(x, y)
} else {
Cb3(x, y) = 0
}
```

Substituting thus obtained color difference values Cr3 (x, y) and Cb3 (x, y) into the following formulas, the color correcting section 15 generates an output image (R3, G and B3).

$$R3(x,y)=Cr3(x,y)+G(x,y)$$

$$B3(x,y)=Cb3(x,y)+G(x,y)$$

In addition, although the section 15 performs color correction with respect to the color drift correction image here, it is not limited to this. For example, it may perform color correction with respect to the input image. In this case, it is desirable for the section 15 to perform stronger saturation suppression with respect to the input image, so as to include also color suppression effect caused by color drift correction.

Effect Etc. of First Embodiment

Figure 3:
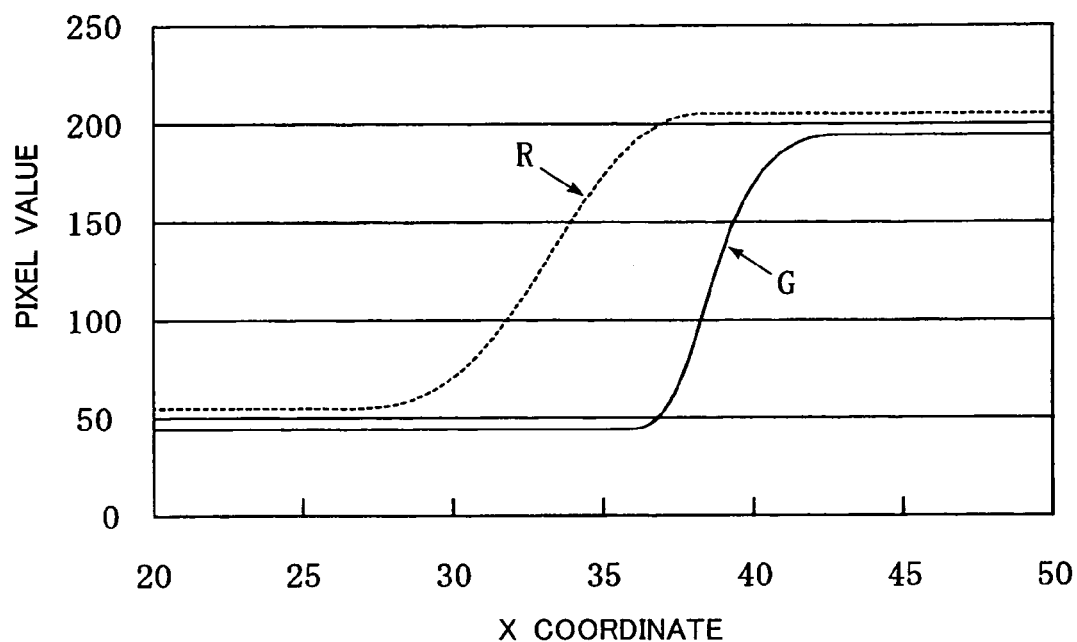
FIG. 3 is a view showing color structures of an input image.

FIG. 3 is a view showing color structures of R and G components of an input image. Here, for simplicity of description, a case where the color structures drift in the direction of X coordinate of the image is shown.

Figure 4:
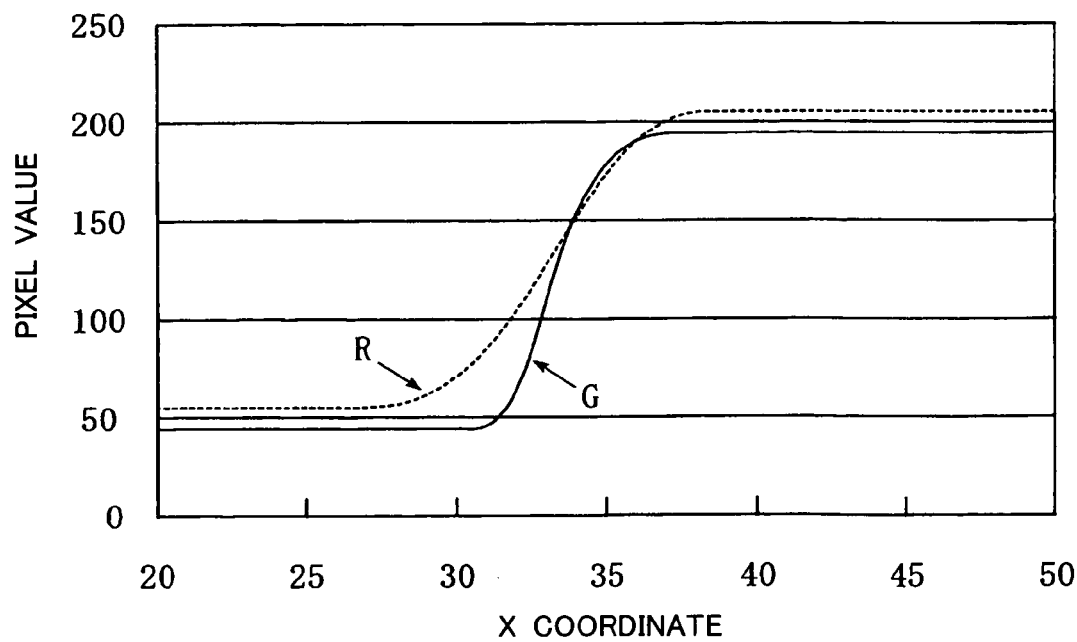
FIG. 4 is a view showing color structures after color drift correction.

FIG. 4 is a view showing color structures of R and G components of an input image immediately after color drift correction (Step S3). In FIG. 4, although the positional drift between R and G components can be corrected, red smear (differences in color structure) remaining at the left-hand side of an edge cannot be removed.

Figure 5:
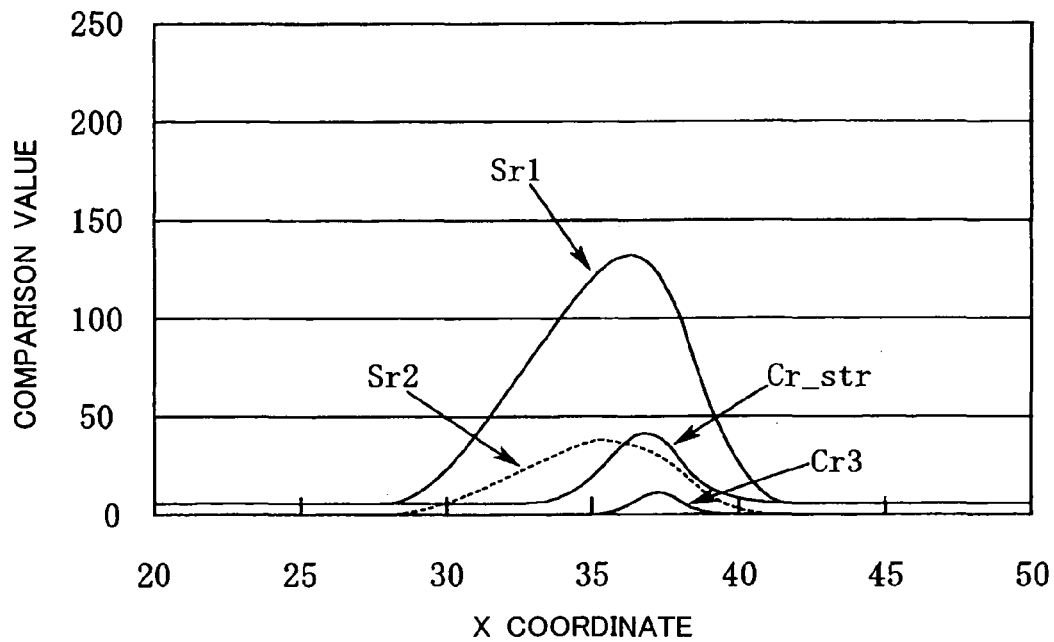
FIG. 5 is a view showing changes in color structures before and after color drift correction.

FIG. 5 is a view showing changes of color structures between the input image and the color drift correction image. First, it can be determined that large chromatic aberration has occurred in a portion where color saturation Sr2 of the color drift correction image is reduced larger than color saturation Sr1 of the input image. In such a portion, the differences in the color structure remaining slightly after color drift correction can be considered as remaining chromatic aberration rather than significant picture information of a picture itself. Thus, a portion where the degree of saturation reduction Cr_down2 exceeds a predetermined threshold value Thr, is extracted, and intensity of color suppression Cr_str (x, y) of the portion is set to be relatively large.

Figure 6:
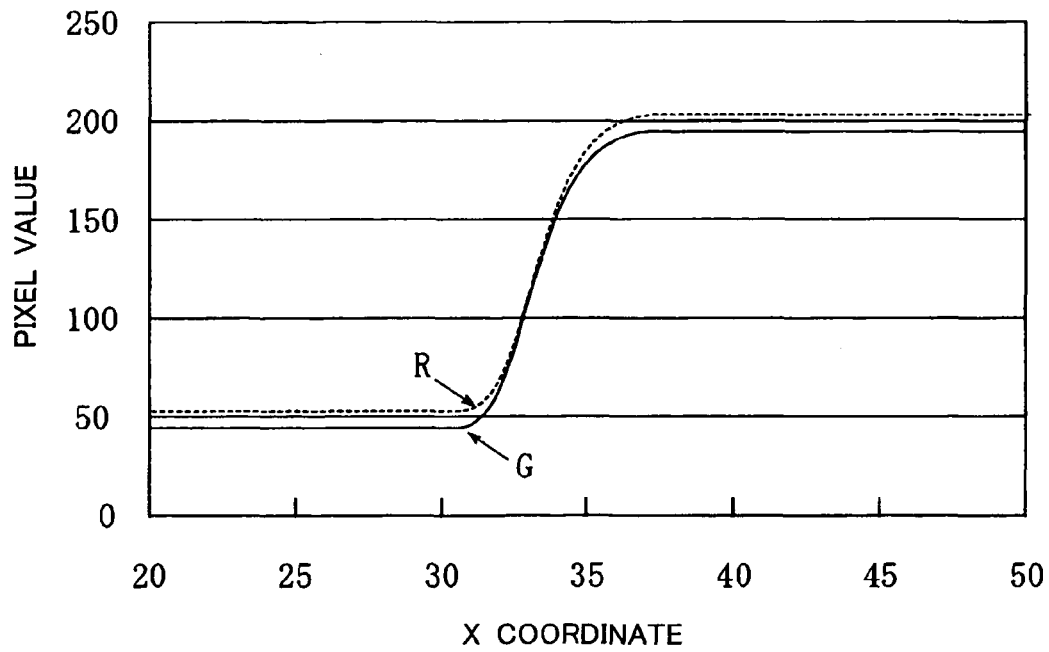
FIG. 6 is a view showing color structures after color suppression.

FIG. 6 is a view showing a color drift correction image after color suppression. The read smear which has been remained in FIG. 4 can be suitably removed between R and G components in FIG. 6, by reduction of saturation according to the above-mentioned intensity of color suppression Cr_str (x, y). On the other hand, at a portion where degree of saturation reduction is small, since color saturation is hardly reduced, an original color structure of a picture itself can be maintained truly.

Second Embodiment

Figure 7:
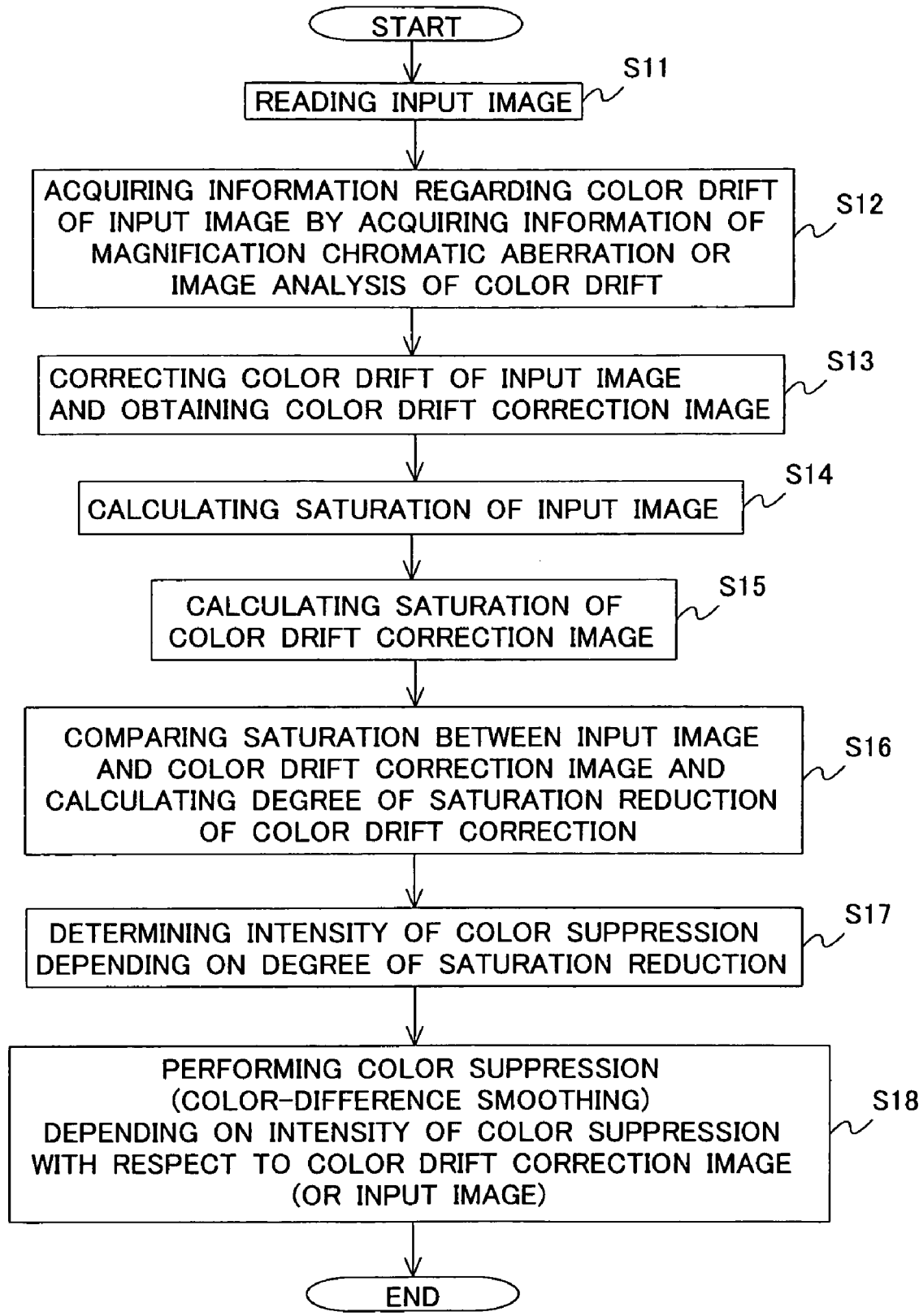
FIG. 7 is a flow chart showing an operation of a second embodiment.

FIG. 7 is a flow chart showing an operation of a second embodiment. In addition, since a configuration of the second embodiment is the same as that (FIG. 1) of the first embodiment, duplicated description thereof will be eliminated here. Hereinafter, the operation of the second embodiment will be described in sequential-order of step numbers shown in FIG. 7.

Steps S11 to S17: Operations at these Steps are the same as those at Steps S1 to S7 of the first embodiment.

Step S18: A color correcting section 15 performs color suppression (here color-difference smoothing) depending on the intensity of color suppression with respect to color difference values Cr2 (x, y) and Cb2 (x, y) of the color drift correction image.

For example, the section 15 may extract a portion where Cr_str(x, y)>0 is satisfied, from the color drift correction image, and perform local smoothing described by the following formulas with respect to the color difference values Cr2 (x, y) and Cb2 (x, y) of the portion.

$$Cr4(x,y)=1/16\times[4\times Cr2(x,y)+2\times\{Cr2(x+2,y)+Cr2(x-2,y)+Cr2(x,y+2)+Cr2(x,y-2)\}+\{Cr2(x+2,y+2)+Cr2(x+2,y-2)+Cr2(x-2,y+2)+Cr2(x-2,y-2)\}]$$

$$Cb4(x,y)=1/16\times[4\times Cb2(x,y)+2\times\{Cb2(x+2,y)+Cb2(x-2,y)+Cb2(x,y+2)+Cb2(x,y-2)\}+\{Cb2(x+2,y+2)+Cb2(x+2,y-2)+Cb2(x-2,y+2)+Cb2(x-2,y-2)\}]$$

Next, according to the following conditional formulas, color difference values Cr3 (x, y) and Cb3 (x, y) subjected to color suppression are determined.

```
IF (|Cr4(x, y) – Cr2(x, y)| < Cr_str(x, y)) {
  Cr3(x, y) = Cr4(x, y)
} else {
  IF (Cr4(x, y) > Cr2(x, y)) {
    Cr3(x, y) = Cr2(x, y) + Cr_str(x, y)
  } else {
    Cr3(x, y) = Cr2(x, y) – Cr_str(x, y)
  }
IF (|Cb4(x, y) – Cb2(x, y)| < Cb_str(x, y)) {
  Cb3(x, y) = Cb4(x, y)
} else {
  IF (Cb4(x, y) > Cb2(x, y)) {
    Cb3(x, y) = Cb2(x, y) + Cb_str(x, y)
  } else {
    Cb3(x, y) = Cb2(x, y) – Cb_str(x, y)
  }
```

By substituting thus obtained color difference values Cr3 (x, y) and Cb3 (x, y) into the following formulas, the color correcting section 15 generates an output image (R3, G and B3).

$$R3(x,y)=Cr3(x,y)+G(x,y)$$

$$B3(x,y)=Cb3(x,y)+G(x,y)$$

In addition, although the section 15 performs color correction with respect to the color drift correction image here, it is not limited to this. For example, it may perform color correction with respect to the input image. In this case, it is desirable for the section 15 to perform strong color-difference smoothing with respect to the input image, so as to include also color suppression effect caused by color drift correction.

Effect Etc. of Second Embodiment

In the second embodiment, a portion where the degree of saturation reduction is large is subjected to color-difference smoothing. Differences of color structure which cannot be removed by color drift correction show up mainly as a high area deviation of color difference. As a result, the suppression of the high area deviation of color differences by color-difference smoothing, surely enables to reduce the differences of color structure.

On the other hand, in a portion where the degree of saturation reduction is small, the color-difference smoothing is hardly performed. Thus, an original color structure of a picture can be truly remained.

Furthermore, in the second embodiment, saturation suppression is performed instead of color-difference smoothing with respect to a part where color difference value Cr4 (x, y) is changed significantly from an original color difference value Cr2 (x, y) by color-difference smoothing. Thus, a situation where the color structure of a portion is changed greatly under the influence of surrounding color differences due to color-difference smoothing can be avoided.

Third Embodiment

FIG. 8 is a flow chart showing an operation of a third embodiment. In addition, since the configuration of the third embodiment is the same as that (FIG. 1) of the first embodiment, duplicated description thereof will be eliminated here. Hereinafter, the operation of the third embodiment will be described in a sequential-order of step numbers shown in FIG. 8.

Steps S21 to S27: Operations at these steps are the same as those at Steps S1 to S7 of the first embodiment.

Step S28: The color correcting section 15 calculates color saturation S (x, y) of the coordinate (x, y) based on the following formula.

$$S(x,y)=|Cr2(x,y)|+|Cb2(x,y)|$$

The section 15 extracts a low saturation area where color saturation S (x, y) has a threshold value Th1 or less. For image areas other than the low saturation area, according to the following conditional formula, it sets intensities of color suppression Cr_str (x, y) and Cb_str (x, y) to be zero, and removes the areas from targets of color suppression processing.

```
IF (S(x, y) > Th1) {
  Cr_str(x, y) = 0
  Cb_str(x, y) = 0
}
```

The above-mentioned threshold value Th1 is a parameter which is experimentally determined, based on image quality evaluation of the output image. For example, when color components are composed of 8 bits of gradation, it is suitable to set approximately Th1=160.

Step S29: The color correcting sections 15 readjusts intensities of color suppression Cr_str (x, y) and Cb_str (x, y) in the low saturation area, according to the following conditional formula.

```
IF (S(x, y) > Th2) {
  Cr_str(x, y) = Cr_str(x, y) × (Th1 – S (x, y))/(Th1 – Th2)
  Cb_str(x, y) = Cb_str(x, y) × (Th1 – S (x, y))/(Th1 – Th2)
}
```

The above-mentioned threshold value Th2 is a parameter which is experimentally determined, based on image quality evaluation of the output image. For example, when color components are composed of 8 bits of gradation, it is suitable to set approximately Th2==80.

In addition, for an image area where S(x, y)≦Th2 is satisfied, intensities of color suppression Cr_str (x, y) and Cb_str (x, y) set at Step S27 are maintained as they are.

Step S30: Processing at this step is the same as that at Step S8 of the first embodiment, or Step S18 of the second embodiment.

Effect Etc. of Third Embodiment

While differences in color structure remaining after color-drift correction are noticeable in a low saturation area having nearly an achromatic color, it is not so noticeable in a high saturation area. Thus, in the third embodiment, high saturation areas where color saturation S (x, y) is greater than a threshold value Th1, are removed from targets of color suppression by readjusting intensities of color suppression to be near zero. As a result, a valuable color structure in a high saturation area can be kept truly.

Furthermore, in the third embodiment, image areas where Th2<S(x, y)≦Th1 is satisfied, are readjusted so that as color saturation S (x, y) becomes closer to the threshold value Th1, intensity of color suppression becomes smaller. As a result, even in an area having intermediate color saturation, color structure of a picture itself can be maintained suitably. Moreover, in the third embodiment, from areas having intermediate color saturation to areas having low color saturation, intensities of color suppression are gradually strengthened. Thus, the disadvantage that a borderline between an area subjected to color suppression and an area not subjected to color suppression becomes noticeable, can be prevented.

Supplementary Notes for Embodiment

In addition, in the above-mentioned second embodiment, image areas to be subjected to color-difference smoothing are restricted by the degree of saturation reduction. However, the present application is not limited to this. For example, a reference range and a coefficient value of a color-difference smoothing filter may be adjusted so that portions having larger degree of saturation reduction are subjected to stronger smoothing.

Moreover, the saturation suppression of the first embodiment, and the color-difference smoothing of the second embodiment may be carried our in a superposed manner. For example, color-difference smoothing of an output image subjected to saturation suppression depending on the degree of saturation reduction may be performed on the degree of saturation reduction. In this case, different effects such as an effect of lightening colors by the saturation suppression and an effect of suppressing unexpected color-difference fluctuation by the color-difference smoothing, can be combined. As a result, difference among various color structures can be more definitely reduced.

In addition, in the third embodiment, intensities of color suppression are changed depending on saturation S (x, y). However, the present application is not limited to this. For example, images before and after color suppression may be synthesized by weighting depending on their degree of saturation S (x, y) so as to obtain the same effect as that of the third embodiment.

Moreover, in the third embodiment, it is desirable to calculate saturation S (x, y) from an image after color drift correction or color suppression. In this case, a borderline between an achromatic color area and a chromatic color area can be distinguished in high accuracy, without being influenced so much by color drift.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An image processing device, comprising:
a color drift correcting section correcting a color drift of an input image and generating a color drift correction image;
a saturation reduction calculating section calculating a degree of saturation reduction caused by the color drift correction by comparing the input image with the color drift correction image; and
a color correcting section performing a color correction depending on the degree of saturation reduction with respect to a processed image of either one of the input image and the color drift correction image.

2. The image processing device according to claim 1, wherein
the color correction by the color correcting section is a processing which suppresses more strongly a color of a portion in which the degree of saturation reduction being large than a color of a portion in which the degree of saturation reduction being small.

3. The image processing device according to claim 1, wherein
the color correction by the color correcting section is a processing which determines a portion in which the degree of saturation reduction being large in the processed image, and suppresses a saturation of the portion.

4. The image processing device according to claim 1, wherein
the color correction by the color correcting section is a processing which determines a portion in which the degree of saturation reduction being large in the processed image, and smoothes a color difference of the portion.

5. The image processing device according to claim 1, wherein
the color correcting section determines an image area with a low saturation, and performs more strongly the color correction of the image area than areas other than the image area with the low saturation.

6. The image processing device according to claim 1, wherein
the color correcting section determines whether a portion in which the color drift correction is performed is a remaining chromatic aberration or image information based on the size of the degree of saturation reduction being calculated, and performs a correction to reduce degree of saturation on the portion in which the color drift correction is performed when result of determination is the remaining chromatic aberration.

7. An image processing device according to claim 1, comprising:
a color drift correcting step correcting a color drift of an input image and generating a color drift correction image;

a saturation reduction calculating step calculating a degree of saturation reduction caused by the color drift correction by comparing the input image with the color drift correction image; and a color correcting step performing a color correction depending on the degree of saturation reduction with respect to a processed image of either one of the input image and the color drift correction image.

8. The image processing device according to claim 7, wherein the color correction step determines whether a portion in which the color drift correction is performed is a remaining chromatic aberration or image information based on the size of the degree of saturation reduction being calculated, and performs a correction to reduce degree of saturation on the portion in which the color drift correction is performed when result of determination is the remaining chromatic aberration.

9. The image processing device according to claim 2, wherein the color correcting section determines an image area with a low saturation, and performs more strongly the color correction of the image area than areas other than the image area with the low saturation.

10. The image processing device according to claim 3, wherein the color correcting section determines an image area with a low saturation, and performs more strongly the color correction of the image area than areas other than the image area with the low saturation.

11. The image processing device according to claim 4, wherein the color correcting section determines an image area with a low saturation, and performs more strongly the color correction of the image area than areas other than the image area with the low saturation.

* * * * *

UNITED STATES PATENT AND TRADEMARK OFFICE
CERTIFICATE OF CORRECTION

| | | |
|---|---|---|
| PATENT NO. | : 8,155,439 B2 | Page 1 of 1 |
| APPLICATION NO. | : 12/312712 | |
| DATED | : April 10, 2012 | |
| INVENTOR(S) | : Akihiko Utsugi | |

It is certified that error appears in the above-identified patent and that said Letters Patent is hereby corrected as shown below:

ON THE COVER PAGE:

Item (87), please change "PCT Pub. Date: Dec. 6, 2008" to --PCT Pub. Date: Jun. 12, 2008--.

Signed and Sealed this
Fourth Day of September, 2012

David J. Kappos
*Director of the United States Patent and Trademark Office*